UNITED STATES PATENT OFFICE.

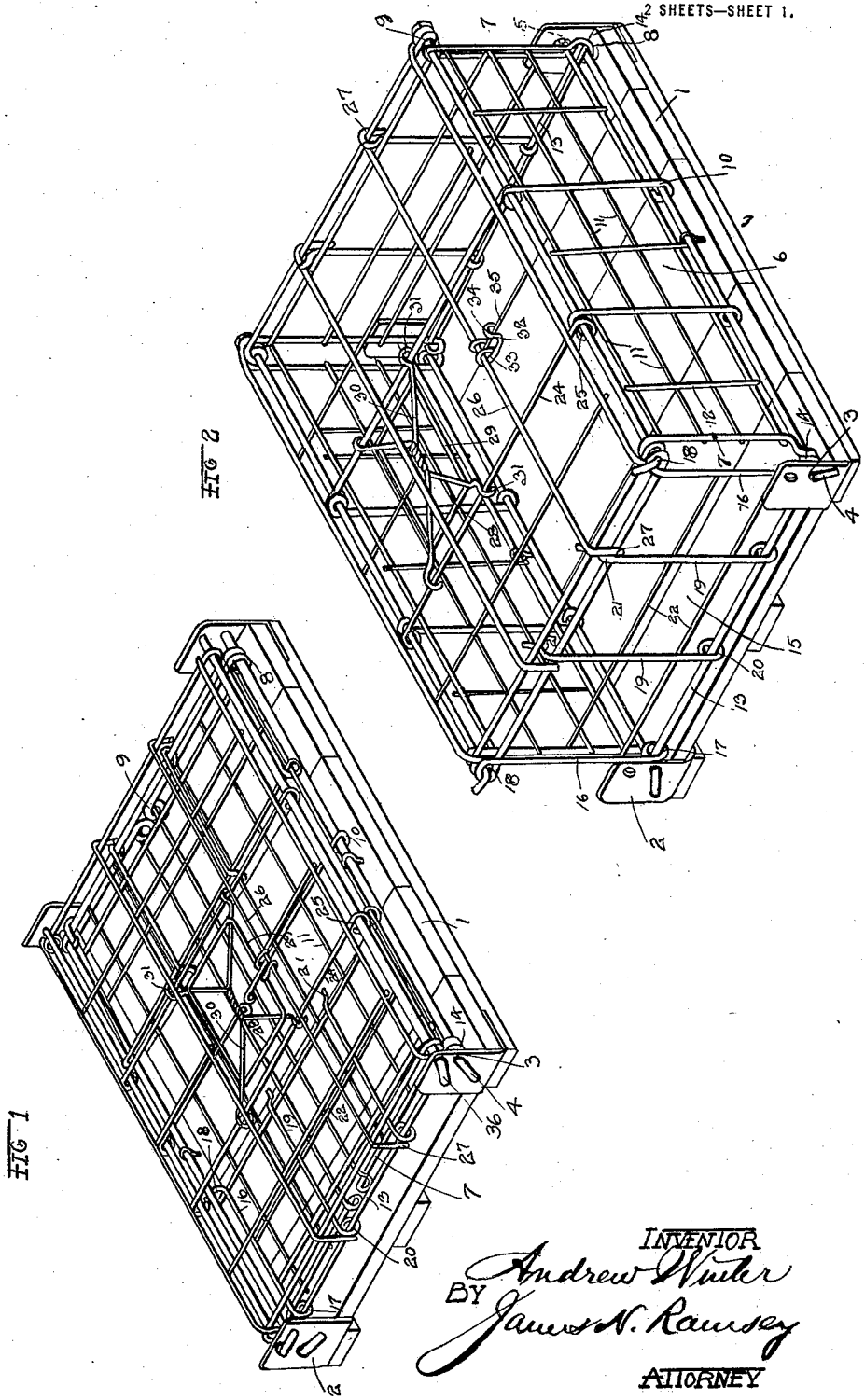

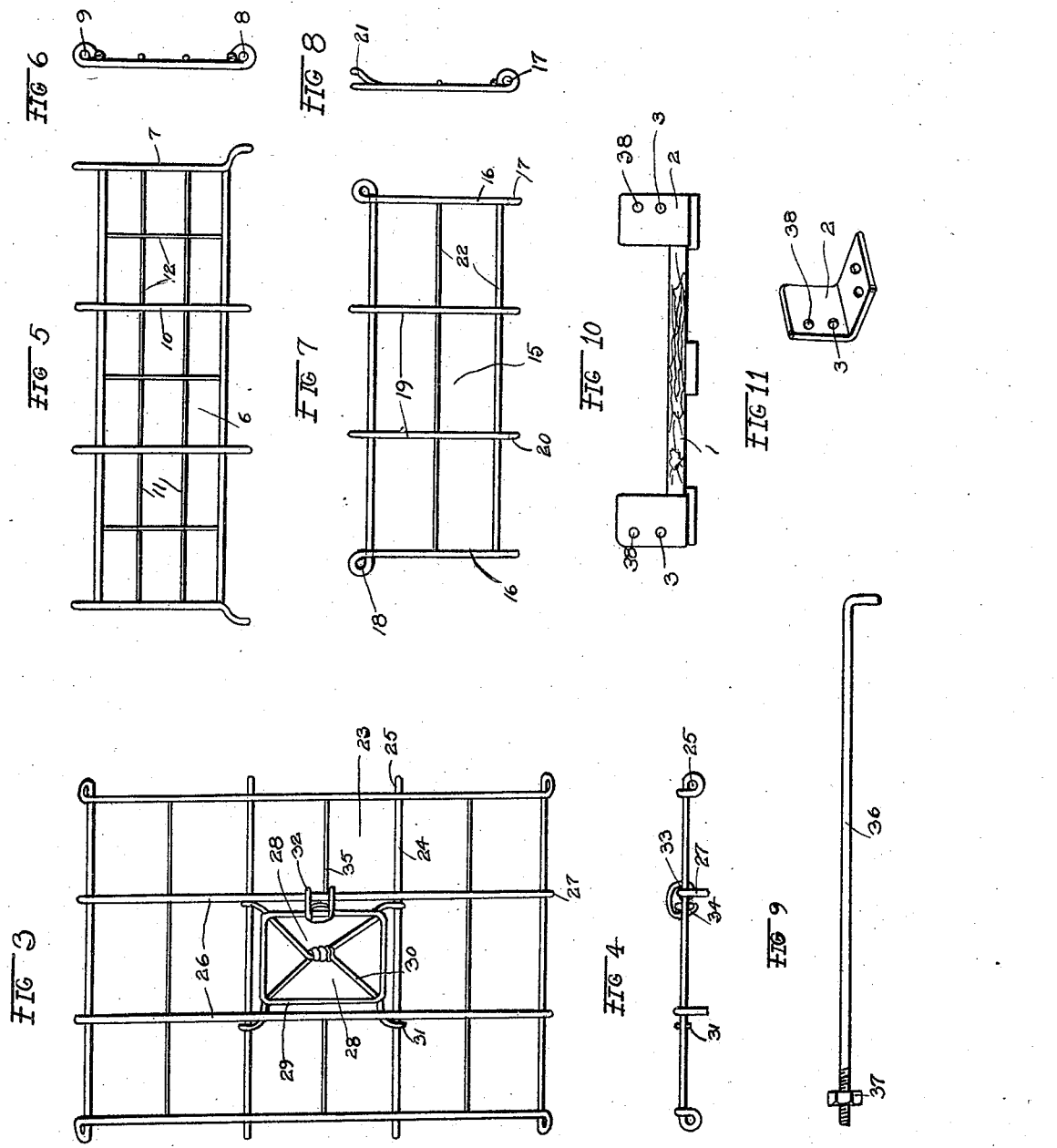

ANDREW WINTER, OF COVINGTON, KENTUCKY.

COLLAPSIBLE CRATE.

1,416,150.  Specification of Letters Patent.  Patented May 16, 1922.

Application filed October 14, 1920. Serial No. 416,827.

*To all whom it may concern:*

Be it known that I, ANDREW WINTER, a citizen of the United States, residing at Covington, in the county of Kenton and State of Kentucky, have invented certain new and useful Improvements in Collapsible Crates, of which the following is a specification.

My invention relates more particularly to wire or metallic crates for shipping poultry and the like.

The object of my invention is to provide a convenient, simple, efficient and economical crate that may be readily built up to form an enclosure and so shipped with poultry therein, and which after the poultry have been removed can be quickly and easily collapsed in compact and convenient form for reshipping, so as to avoid the use of unnecessary space and consequent extra expense in returning the crates for the purpose of repeated use for the shipping of poultry and the like.

My invention consists in providing a collapsible crate having a suitable board or other equivalent floor to which sides and ends of crossed or meshed wires are pivotally attached and adapted to be swung upwardly at right angles to the floor when in open position or to be folded flat upon each other and upon the floor when the crate is in collapsed position, together with a detachably crossed wire or mesh top adapted to be detachably connected to the sides and ends either in opened or collapsed positions.

My invention also consists in the sliding door in the top, and in the construction, combination and arrangement of parts, as well as in the details of construction as herein set forth and claimed.

In the drawings:

Fig. 1 is a perspective view of a collapsible wire crate in closed position;

Fig. 2 is a perspective view of the same in open position;

Fig. 3 is a plan view of the top of the crate;

Fig. 4 is an end elevation of the top of the crate;

Fig. 5 is an elevation of the side of the crate;

Fig. 6 is a vertical end view of the side of the crate;

Fig. 7 is an elevation of an end of the crate;

Fig. 8 is a vertical end view of an end of the crate;

Fig. 9 is a view of one of the securing rods and nuts;

Fig. 10 is an end elevation of the bottom of the crate with supports attached thereto; and Fig. 11 is a perspective view of one of the supports.

In the embodiment of my invention as illustrated, and which shows a preferred construction, I provide a floor or bottom 1 which may be made of wood or other suitable material, and adjacent each corner I secure a support 2 each having a hole 3 adapted to receive a side hinge-rod 4 which is secured thereon by a nut 5. Each side 6 is composed of end-wires 7 each bent inwardly at the bottom to form an eye 8 and also bent inwardly at the top to form an eye 9, and also intermediate upright wires 10 similarly formed and spaced apart from each other, said wires being pivotally attached through said eyes to hinge-rod 4. Cross-wires 11, spaced apart from each other, are attached to said upright wires by spot welding or otherwise, to form a grating which will admit light and air but which are arranged sufficiently close together to prevent the poultry from passing therethrough. Suitable reinforcing upright wires 12 are attached to the cross-wires in any suitable manner. The upright end wires of the side gratings are bent laterally at their lower ends to engage the end hinge-rods in order to provide space between the upper ends of the eye of the side and end gratings to receive the end eye of the top grating therebetween. End hinge-rods 13 each having an eye 14 at each end extend across each end slightly above the bottom and are mounted upon the respective side hinge-rods between the adjacent support and the upright end wires. Each end 15 is composed of upright end-wires 16 having inwardly formed eyes 17 at the bottom and having laterally formed eyes 18 at the top and intermediate upright wires 19 each having an inwardly formed eye 20 at the bottom and each having at the top an inwardly and upwardly extending lug 21, and a series of cross-wires 22 spaced apart and spot welded or otherwise secured to said upright wires for the purpose of forming a grating similar to that of the side grating. The end wires 16, when in upright position, engage supports 2 which hold said ends from moving outwardly out of upright position. The top 23 is formed of a series of spaced apart cross-wires 24 each having a downwardly turned eye 25 at each end and having a series of longitudinal wires 26 extending transversely of said cross-wires and spot welded or otherwise suitably secured thereto, the intermediate wires 26 preferably having downwardly turned ends 27 to engage the end 15, and said crossed wires being spaced apart sufficiently to permit the passage of light and air, but to prevent the escape of the poultry therethrough. A suitable door 28 is formed of a rectangular wire frame 29, having diagonal intermeshed cross-wires 30 secured thereto at their corners, said cross-wires each being bent upwardly at its end to form an eye 31 to receive the adjacent cross-wires on which said door is slidably mounted, two of said eyes being mounted on one side of a longitudinal wire and two on the other side thereof, so that said door may be slid to either open or closed position beneath one of said longitudinal wires and when in closed position may be latched by means of a pivotally mounted catch 32 comprising a loop having a hinge-eye 33 formed in each end and being bent to form a hook 34 which, when said eyes are mounted upon one of the longitudinal wires of the top adjacent the door opening and upon each side of the wire 35, said catch may be swung into engagement with the rectangular door frame, as shown in Fig. 3, to hold said door in closed position, or it may be swung backwardly upon said wire 35, as shown in Fig. 2, for the purpose of permitting said door to be slid to open position for gaining access to the interior of said collapsible crate.

When it is desired to adjust the crate to open position for the reception of poultry, simply swing the sides 6 and ends 15 to vertical or upright position and place the top thereon in the position shown in Fig. 2 in which the eyes of the sides, ends and top will be in registry or alinement with each other, then insert the securing rods 36 through said eyes until the head thereof engages the eye at one end and the threads extend through the eyes of the other end and then fasten said securing rods by nuts 37.

This collapsible crate may be made of varying sizes and a suitable number of screw eyes 39 may be secured to the bottom and the hinge-rods respectively to straighten and reinforce the parts relative to each other.

When it is desired to form an enclosure of the crate for use in shipping poultry and the like, first swing the end gratings to upright position and then place the top grating thereon so that the downward extending lugs of the top grating will extend over the upper edge of the end grating at each end, and the upwardly and inwardly extending lugs of each end will engage the top grating, thereby holding said parts in adjusted relation relative to each other, then swing each side grating upwardly upon its hinges until the eyes of said side, end and top gratings are in alinement with each other, then insert the securing rod therethrough and fasten it therein by a nut, then swing the other side grating upwardly in the same manner until the eyes of the side, end and top gratings are in alinement, and then secure said gratings together by the securing rod and its nut.

When it is desired to collapse the crate, simply remove the securing rods 36, folding the sides inwardly upon the bottom and the ends inwardly upon the sides. Then place the top thereon with its eyes in registry with holes 38 in supports 2 and insert said securing rods through said openings and the eyes in said top, respectively, and fasten each rod by its nut 37. By this simple operation the crate is in the very compact position shown in Fig. 1 ready for reshipment for the purpose of further use in the shipping of poultry. Thus, a single crate of this construction may be used repeatedly over a long period of time, thereby dispensing either with the shipping of a large bulky empty crate at extra expense, or, if this is not done, without supplying a new crate for each shipment of poultry. Furthermore, this construction is of great advantage when it is desired to store the crate, either while in the factory or on sale, or during periods of the season when they are not required for active use.

It will be apparent that my invention is capable of some modification without material departure from its scope or spirit as defined in the claims which I desire to have construed accordingly.

What I claim as new and desire to secure by Letters Patent is:

1. In a collapsible crate, a bottom, supports attached thereto, detachable side hinge-rods mounted on said supports, side gratings pivotally mounted on said side hinge-rods, detachable end hinge-rods mounted on said side hinge-rods, end gratings pivotally mounted on said end hinge-rods, a top grating and means for detachably connecting said sides, ends and top.

2. In a collapsible crate, a bottom, a support secured near each corner thereof, detachable side hinge-rods mounted on said supports, detachable end hinge-rods suitably mounted, side and end gratings pivotally mounted on said side and end hinge-rods respectively, a top grating, and means for detachably connecting said side and end gratings to said top grating.

3. In a collapsible crate, a bottom, supports secured thereto near each corner, side hinge-rods mounted on said supports, end hinge-rods suitably mounted, side and end gratings pivotally mounted on said side and end hinge-rods respectively, said side and end gratings each having eyes in alignment with each other when in closed position, a top grating placed on said side and end gratings and having eyes adapted to register with the eyes of said top and end gratings and securing rods inserted in said eyes, whereby said parts are detachably connected.

4. In a collapsible crate, a bottom, an upright support at each corner thereof, and each support having a hole therein, side hinge-rods mounted in said holes, end hinge-rods mounted on said side hinge-rods, side gratings having inwardly turned eyes at bottom and top, the bottom hinge eyes encircling said side hinge-rods, end gratings having inwardly turned eyes at the bottom, the end hinge-rods being inserted in said eyes and the top eyes being turned laterally to register with the inturned eyes of the side gratings, a top grating having downwardly extended eyes adapted to register with the eyes of the side and end gratings, and securing rods inserted in said eyes and each held thereon by a nut.

5. In a collapsible crate, a bottom, a support at each corner thereof, having two holes therein, one above the other, a hinge-rod secured in the lower hole of each pair of supports, end hinge-rods suitably mounted, side and end gratings having inwardly extending eyes mounted on said hinge-rods respectively, said side gratings having top inwardly extending eyes and said end gratings having laterally outwardly turned eyes at the top adapted when said gratings are in open position to be in alinement with the top eyes of the side gratings, a top grating having downwardly extending eyes adapted to register with the top eyes of the side and end gratings and securing rods inserted in said top eyes, whereby said crate may be detachably held in open position and may be withdrawn and the side and end grates may be inwardly folded and the top grate placed thereon and said securing rods inserted in the top holes of said supports and in the eyes of said top grating, whereby said crate is detachably held in collapsible position.

6. In a collapsible crate, a bottom, supports attached thereto, side hinge-rods mounted on said supports, end hinge-rods suitably mounted, side and end gratings pivotally mounted on said side and end hinge-rods respectively, a top grating, means for detachably connecting said side and end gratings to said top grating, and a door having upwardly extending eyes each encircling cross-wires, two of said eyes being on one side and two on the other side of the longitudinal wire of the top grating, whereby said door may be slid to open or closed position, and a pivotally mounted catch adapted to engage and hold said door in closed position.

7. In a collapsible crate, a bottom, side and end gratings pivotally mounted thereover, and adapted to be swung to upright position or to be folded parallel with said bottom, a top grating and means for detachably connecting said top grating to said side and end gratings.

8. In a collapsible crate, a bottom, side and end gratings pivotally mounted thereover, said end gratings having inwardly and upwardly extending lugs adapted to engage the top grating, and a top grating having downwardly extending lugs spaced apart from each other and adapted to engage the end gratings to firmly hold said top and end gratings in open adjusted relation with each other.

9. In a collapsible crate of the class described having a top grating of transversely spaced apart cross-wires and having a door opening therein, a wire mesh door having eyes thereon adapted to encircle cross wires on said top grating and to be slid thereon into open or closed position, and means for holding said door in closed position.

10. In a collapsible crate of the class described, an open mesh cross-wire top, having a door opening therein, a door mounted thereon and adapted to slide into open or closed position and a pivotally mounted looped hook on the cross-wire top adapted to swing over and engage said door when in closed position and to be swung backwardly upon a cross-wire when in open position.

11. In a collapsible crate, a bottom, supports thereon each having two holes, a screw-eye attached to said bottom, a side hinge-rod secured in the lower holes of each pair of supports and to said screw-eye, end hinge-rods suitably mounted, side and end gratings mounted upon said hinge-rods, said side hinge-rods having eyes at the lower corners bent laterally therefrom for the purpose described, a top grating, and means for connecting said top grating to said side and end gratings.

ANDREW WINTER.